United States Patent [19]
Zibell

[11] 3,779,501
[45] Dec. 18, 1973

[54] AUTOMOBILE STORAGE BRACKET

[76] Inventor: Jules Scott Zibell, 6851 Roswell Rd. N.E., Atlanta, Ga. 30328

[22] Filed: Aug. 25, 1971

[21] Appl. No.: 174,737

[52] U.S. Cl...... 248/302, 224/42.1 C, 224/42.45 R, 248/201
[51] Int. Cl............................................. A47h 1/16
[58] Field of Search .............. 224/42.1 C, 42.1 CA, 224/42.46 A, 42.45 A, 42.45 R, 42.1 R, 224/42.46 R, 42.42 R, 29 C, 29 R, 45 T; 248/302, 248/303; 211/63; 248/201

[56] References Cited
UNITED STATES PATENTS

| | | | |
|---|---|---|---|
| 3,273,769 | 9/1966 | Miller | 224/42.45 R |
| 1,967,427 | 7/1934 | Puckett | 248/302 X |
| 1,240,377 | 9/1917 | Seng | 248/302 X |
| 1,438,659 | 12/1922 | Nailor | 248/303 X |
| 3,226,147 | 12/1965 | Marshall | 224/29 C |
| 2,552,879 | 7/1951 | Woerner | 224/42.45 R |

Primary Examiner—Gerald M. Forlenza
Assistant Examiner—Jerold M. Forsberg
Attorney—Beveridge & DeGrandi

[57] ABSTRACT

A bracket for storing an umbrella, cane, or other elongated, substantially rigid object in an automobile which has a garment hanger over the rear window and a clip such as a shoulder harness clipover the forward window. The bracket is constructed of a single piece, preferably of flexible material, and is comprised of a loop portion dimensioned to fit over and be secured onto the garment hanger, an open hook portion which is dimensioned to accommodate the handle portion of the umbrella and a stem portion which connects the loop portion and the hook portion. The bracket is installed on the garment hanger so that the open hook portion faces upwards, the bayonet of the umbrella is inserted into the clip over the front window and the handle of the umbrella is placed into the open hook portion of the bracket.

3 Claims, 4 Drawing Figures

PATENTED DEC 18 1973  3,779,501

INVENTOR
J. SCOTT ZIBELL

BY Beveridge & De Grandi

ATTORNEYS

AUTOMOBILE STORAGE BRACKET

This invention relates to a bracket which enables an umbrella, cane, fishing rod or other elongated object to be stored in an automobile.

Storing an umbrella, cane, or other elongated substantially rigid object in an automobile has presented problems because there is ordinarily no convenient place in an automobile where such objects may be stored. Thus, in the past elongated objects have been kept for the most part either on the floor or seats of the automobile where they tend to interfere with the movements of the driver and passengers in the car and to be stepped on or sat on. In the alternative these objects have been stored in the trunk of the car where they are inaccessible.

This invention obviates the above problems by providing a simple and inexpensive bracket which may be used in conjunction with the existing parts of an automobile in order to provide a convenient and accessible storage place for an elongated object.

It is thus an object of the invention to provide a storage place in an automobile for an umbrella, cane, or other elongated object.

It is further object of the invention to provide such a storage place cheaply and simple, using a minimum of parts and utilizing to maximum advantage the existing parts of the automobile.

It is a further object of the invention to provide a bracket which may be installed in an automobile simply and without the use of any tools to provide a storage place in the automobile for an umbrella, cane or other elongated objects.

The present invention provides a bracket which may be mounted on the garment hanger (although it may be an integral part of the garment hanger) of an automobile which usually resides just below the roof of the automobile over the rear window. The bracket comprises a loop portion which is dimensioned to fit over the garment hanger and a hook portion which is dimensioned to accommodate the handle portion of an umbrella. The loop portion and hook portion are connected to each other by a stem or shank portion. When the loop portion is mounted on the garment hanger, the hook portion will be held with the open part of the hook facing upwards. The bayonet end of the umbrella is then inserted in a clip over the front window of the automobile which may be the forward shoulder harness clip of the automobile and the handle portion of the umbrella is inserted in the upward facing hook portion of the bracket. If the automobile is not provided with such a shoulder harness clip then a temporary clip on member may be provided on the vehicle.

The invention in a preferred form is illustrated in greater detail in the following figures.

Figure 2:
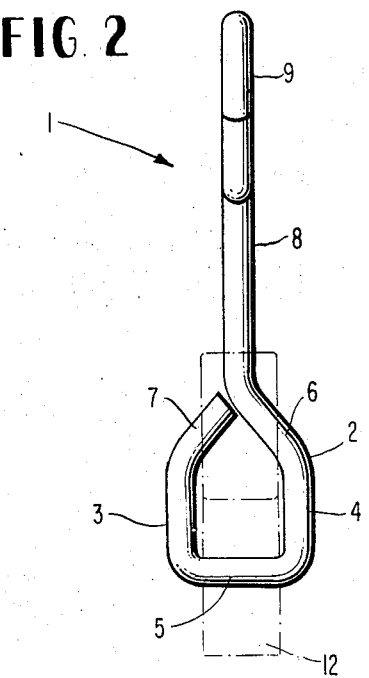
FIG. 2 is a front view of a bracket according to the invention.
Figure 3:
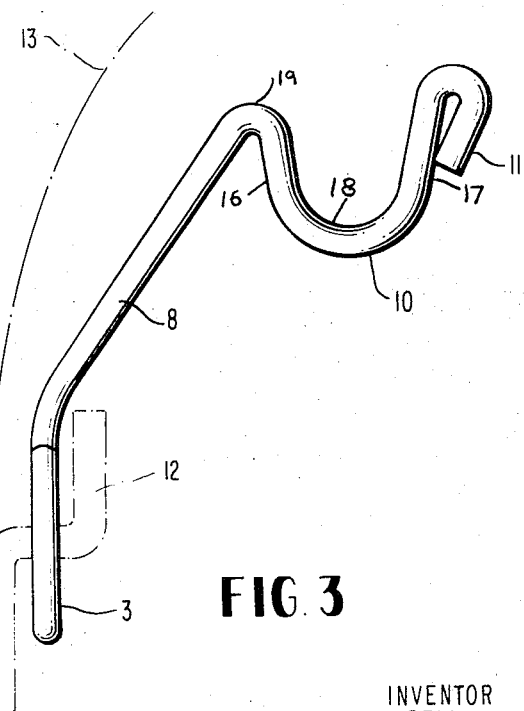
FIG. 3 is a side view of a bracket according to the invention showing the bracket mounted on a garment hanger.

In FIGS. 2 and 3 bracket 1 according to the invention is shown in its preferred form. Bracket 1 is comprised of substantially closed loop portion 4 which is connected to hook portion 10 by stem portion 8. Loop portion 4 is a polygon of five sides. Sides 2 and 3 are substantially parallel to each other and substantially perpendicular to side 5. Sides 6 and 7 join sides 2 and 3 respectively at substantially the same angles. However, loop portion 4 may be replaced by an helical configuration which is adapted to surround the garment hanger.

The sides of loop 4 are dimensioned so that when the loop is placed over the garment hanger 12 which is located over the rear window of an automobile, the bracket will be held securely with hook 10 facing in the upward direction. Dimensions of between one-half inch and 1 inch from the inside lengths of sides 2, 3 and 5 of the loop 4 are suitable with the garment hangers of most automobiles with a dimension of five-eighths inch having been found to be most satisfactory. It will be apparent to one skilled in the art, these dimensions may be changed to suit the particular automobile.

Loop portion 4 is connected to hook portion 10 by stem portion 8. Stem portion 8 is substantially straight in the preferred embodiment but also may be curved. Hook portion 10 is comprised of substantially straight side parts 16 and 17 connected by curved part 18. Hook portion 10 curves back in the direction of stem portion 8 and is connected to stem portion 8 by a second hook portion 19 which is of smaller dimension than the hook portion 10. If desired, hook portion 10 may include bent over portion 11 which eliminates a sharp edge of the end of hook portion 10. A hook opening of approximately 1 inch across has been found to satisfactory accommodate the handle portions of most umbrellas canes, fishing rods etc. Because the bracket may be constructed of flexible or bendable material, the hook portion may be bent opened or closed to a certain degree to accommodate handle portions of different sizes. It should be understood that while a bendable material is disclosed herein relatively rigid materials may be used. Moreover, the bracket may be of a resilient, spring like material so as to better retain objects therein and itself on hanger 12.

Figure 1:
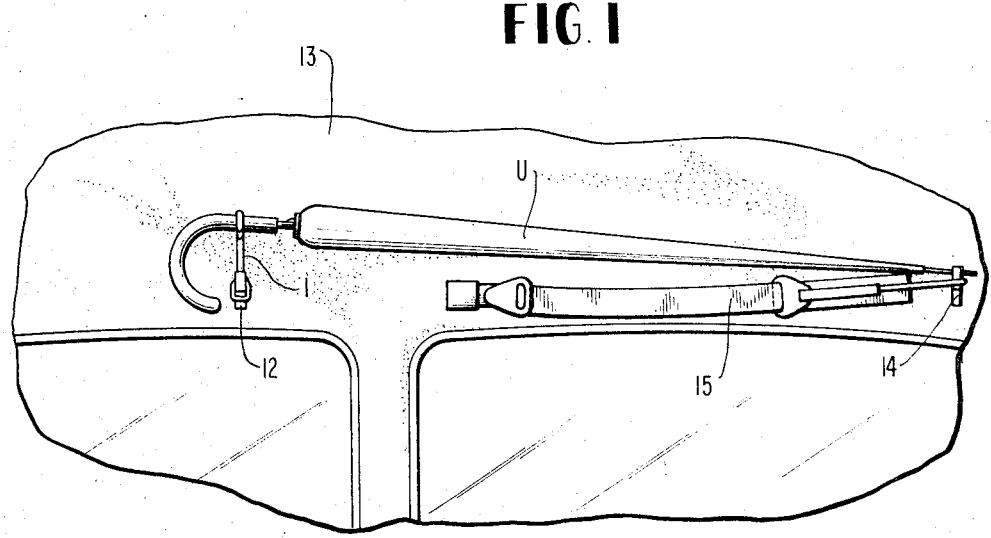
FIG. 1 is a view of the interior of an automobile showing an umbrella mounted in a bracket according to the invention.

FIG. 1 shows umbrella U mounted in the interior of an automobile. As is shown garment hanger 12 is located over the rear window of the automobile while a clip such as the forward shoulder harness clip is located over the forward window of the automobile. It is to be understood that if an automobile does not have a shoulder harness clip over the front window then a clip may be installed over the front window by conventional means. Bracket 1 is mounted on garment hanger 12 as is shown in FIG. 3 so that hook portion 10 faces upwardly after the bracket is mounted stem portion 8 may be bent so that it is clear of the interior 13 of the automobile. The bayonet end of the umbrella or one end of another elongated object is then placed in the forward clip and the umbrella handle is placed in the hook portion of the bracket. The umbrella handle should be pushed down so that it securely locks in the hook portion and the umbrella will be securely mounted between the forward clip and the bracket.

Figure 4:
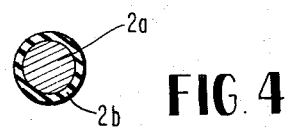
FIG. 4 is a sectional view of the material of which the bracket is constructed.

FIG. 4 shows a cross-sectional view of the material from which the bracket is constructed in the preferred embodiment. 2a is semi-flexible wire such as copper wire which is covered with 2b which is semi-hard plastic covering. While it is advantageous to construct the bracket from flexible material so that it may be reshaped to fit both the contour of the roof and the contour of the particular umbrella handle it should be understood that the bracket may be constructed from any rigid or flexible material such as aluminum, plastic, polyethylene, etc.

The bracket may be made by merely bending a single piece of plastic coated wire to the appropriate shape. As seen in FIGS. 2 and 3 if the bracket is so constructed the ends of the piece of wire will be at the upper end of side 7 of loop portion 4 in FIG. 2 and at the bottom end of portion 11 in FIG. 3.

As will be apparent to persons skilled in the art, various modifications and adaptations of the structure above described will become readily apparent without departure from the spirit and scope of the invention, the scope of which is defined in the appended claims.

I claim:

1. A bracket for storing an umbrella, fishing rod, cane, or other elongated object in a roofed automobile which has a pair of spaced-apart members, one member being secured to a forward side end of said roof and the other member being a garment hanger which is secured to a rearward and same side end of said roof, comprising a first open hook portion dimensioned to accomodate one end of said elongated object, a mounting portion for mounting said bracket to one of said members so that said open hook portion faces in the upward direction, and a stem portion extending downwardly from said hook portion, the plane of said hook portion being normal to the plane of said mounting portion, said member on said forward side end of said roof being adapted to receive and support the opposite end of said elongated object, said mounting portion comprising a substantially closed loop having five sides and being dimensioned to fit over said garment hanger and being retained thereon with said hook portion facing in substantially the vertical upward direction, said hook portion being U-shaped and being comprised of two substantially straight parts of unequal length connected by a curved part, said hook portion extending back in the direction of said stem portion and being connected thereto by a second U-shaped open hook portion, the opening of which faces in substantially the opposite direction from the opening of said hook portion.

2. The bracket of claim 1 wherein said bracket is constructed of a single piece of bent flexible material.

3. A bracket for mounting on a mounting member comprising a first open hook portion, a mounting portion for mounting said bracket to said member, a stem portion extending downwardly from said hook portion and connecting said open hook portion and said mounting portion, the plane of said hook portion being normal to the plane of said mounting portion, said mounting portion comprising a substantially closed loop having five sides and being dimensioned to fit over said mounting member and being retained thereon with said hook portion facing in substantially the vertical upward direction, said hook portion being U-shaped and being comprised of two substantially straight parts of unequal length connected by a curved part, said hook portion extending back in the direction of said stem portion and being connected thereto by a second U-shaped open hook portion, the opening of which faces in substantially the opposite direction from the opening of said hook portion.

* * * * *